Dec. 26, 1922.    S. FREEMAN ET AL    1,440,007
MACHINE FOR EXTRUDING PLASTIC MATERIALS
Filed Sept. 21, 1921    2 Sheets-Sheet 1
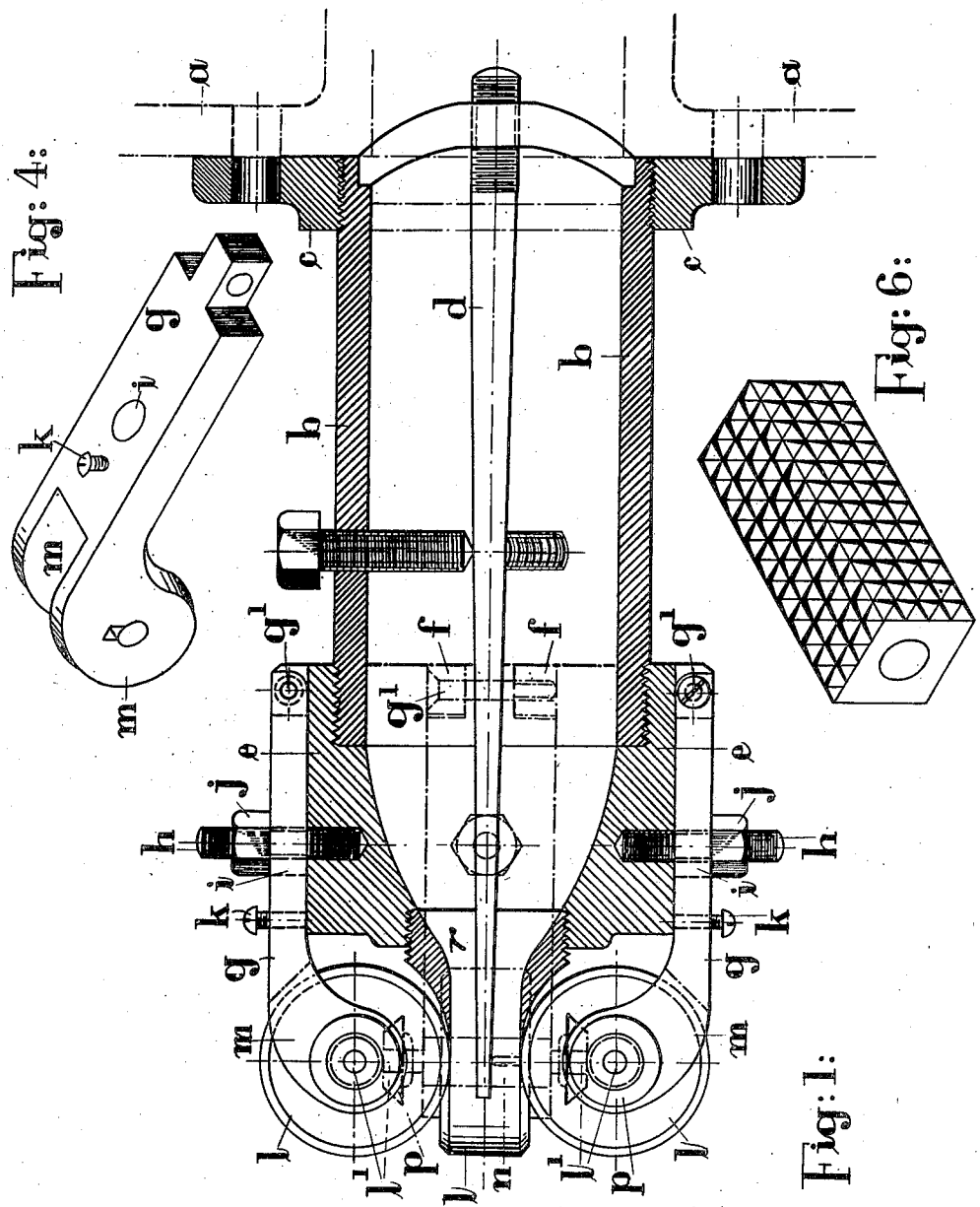

Dec. 26, 1922. S. FREEMAN ET AL 1,440,007
MACHINE FOR EXTRUDING PLASTIC MATERIALS
Filed Sept. 21, 1921 2 Sheets-Sheet 2
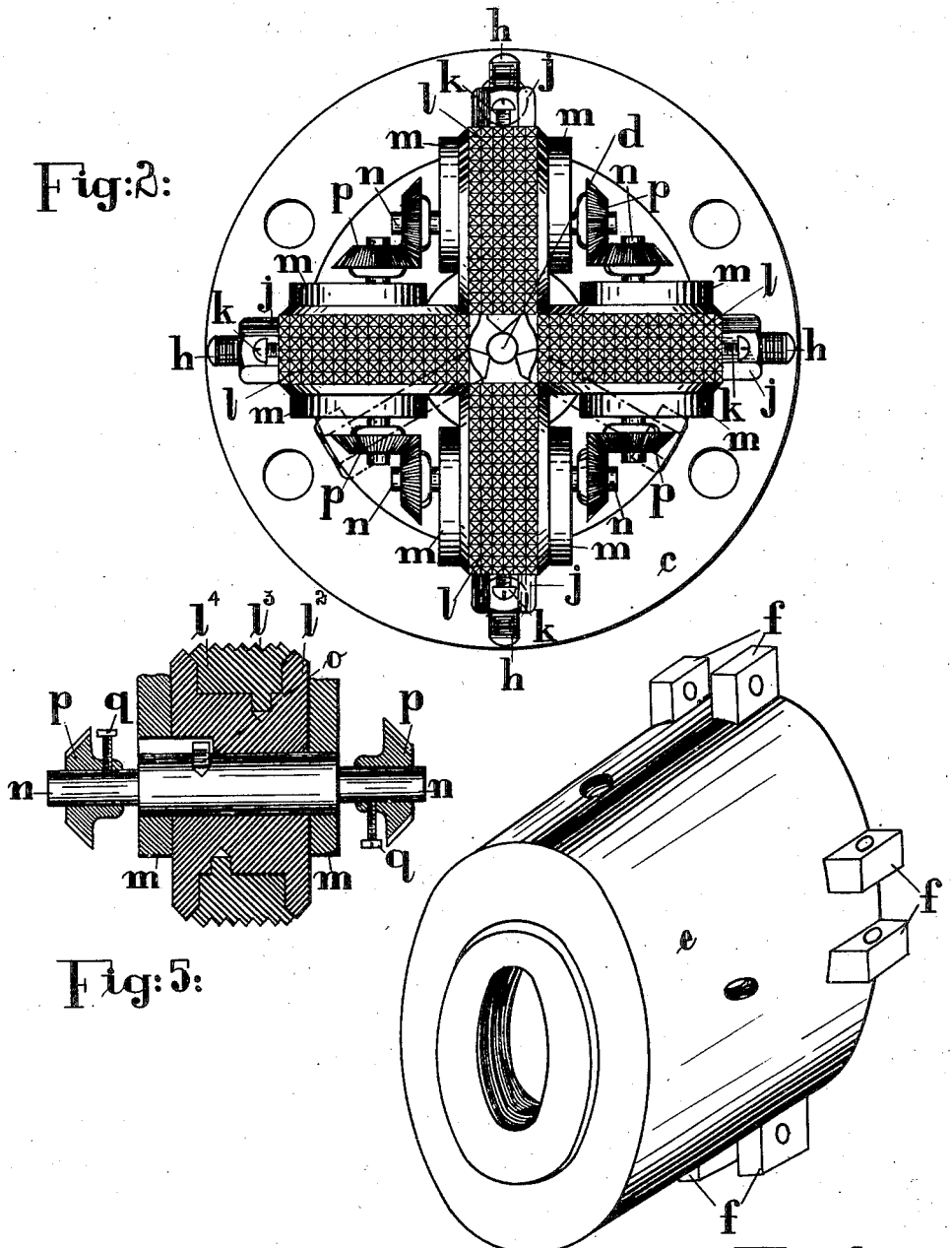
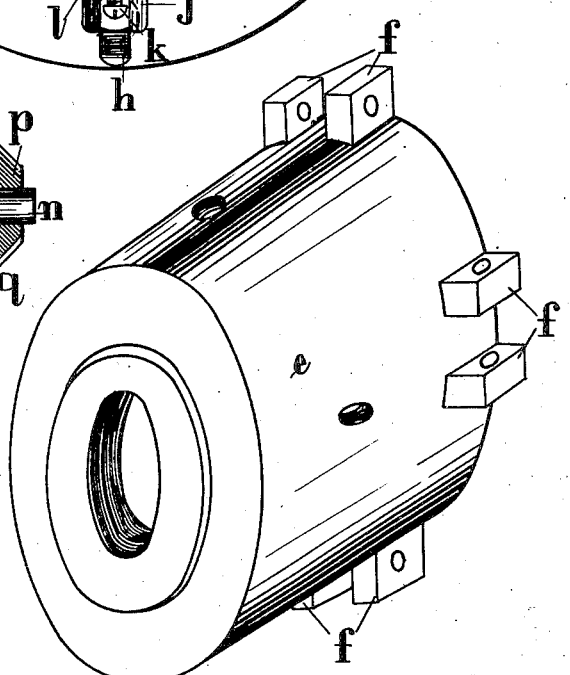
INVENTORS:
Spencer Freeman
By Richard O'Toole
Wm Wallace White
ATTY.

Patented Dec. 26, 1922.

1,440,007

UNITED STATES PATENT OFFICE.

SPENCER FREEMAN AND RICHARD O'TOOLE, OF HAMMERSMITH, LONDON, ENGLAND.

MACHINE FOR EXTRUDING PLASTIC MATERIALS.

Application filed September 21, 1921. Serial No. 502,263.

*To all whom it may concern:*

Be it known that SPENCER FREEMAN and RICHARD O'TOOLE, both subjects of the King of Great Britain and Ireland, residing at, respectively, 55 Aspenlea Road, Hammersmith, in the county of London, England, and 30 Shaftsbury Road, Hammersmith, in the county of London, England, have invented new and useful Improvements in and Relating to Machines for Extruding Plastic Materials, of which the following is a specification.

This invention relates to improvements in machines for extruding plastic materials, has particular reference to the extrusion nozzle of such machines and has for its object the provision of means whereby a continuous pattern of any type can easily, expeditiously and economically be applied to the extruded material and a better product can be made from substance of poor quality with less effort than obtains with known devices.

The invention consists in the arrangement of a plurality of rollers the axes of which are disposed at right angles to the extruded material so that portions of the peripheries of the said rollers will form a complete extrusion orifice, suitable patterns being formed as desired in or on the parts of the peripheries which when associated form the orifice; means adapted to enable the pattern to be easily applied; means adapted to maintain a predetermined angular relation of any roller about its axis of rotation to adjacent rollers during rotation to enable the pattern on adjacent sides of the extruded material to properly join; means adapted to enable any roller to be angularly adjusted about its axis relative to adjacent rollers to enable the pattern on adjacent sides of the extruded material to be properly joined; and means adapted to prevent "back spew" of the material being extruded.

In order that the invention may be the better understood we will now proceed to describe the same in relation to the accompanying drawings, reference being had to the letters and figures marked thereon.

Like letters refer to like parts in the various figures in which:—

Fig. 1 is a sectional longitudinal elevation of an improved extrusion nozzle constructed in accordance with this invention.

Fig. 2 is an end elevation of the extrusion nozzle illustrated in Fig. 1.

Fig. 3 is a perspective view of the nose portion.

Fig. 4 is a perspective view of one roller fork.

Fig. 5 is a sectional elevation of a roller, and Fig. 6 is a perspective view of one class of extruded material.

Referring to the drawings the machine head $a$ has a tubular extension $b$ mounted thereon by the flange $c$; this tubular extension $b$ enables the mandrel $d$ to be properly held in place and perform its usual function.

On the end of the extension $b$ remote from the head $a$ a nose piece $e$ is mounted said nose piece $e$ having pairs of ears or lugs $f$ arranged on that part which is in proximity to the tubular extension $b$.

Between each pair of ears or lugs $f$ a fork $g$ is disposed, pivot screws $g'$ being provided to maintain the forks $g$ in position and at the same time allow of movement of the forks $g$ in a definite plane.

In the nose piece $e$ studs $h$ are arranged said studs $h$ being adapted to pass through the apertures $i$ formed in the forks $g$ when the forks $g$ are in operative position. The studs $h$ are provided with nuts $j$ adapted to lock the forks $g$ in position said forks $g$ having gauge screws $k$ to enable the location of the forks to be easily determined.

A roller $l$ is disposed between the jaws $m$ of each fork $g$ and is mounted on an arbor $n$ which is journalled in the jaws $m$. The arbor $n$ may have a key or the like $o$ adapted to engage the hub $l'$ of the roller $l$.

When the peripheral surface of all the rollers $l$ is provided with a pattern all the rollers $l$ may be geared together by bevel wheels $p$ so as to maintain the peripheral speed of all the rollers $l$ similar, said bevel wheels $p$ being mounted on the arbors $n$ and driven by or drive said arbors $n$ through clamping screws $q$ adapted to enable angular adjustment of any roller $l$ about its arbor $n$ to be effected relative to the angular position of the adjacent rollers $l$.

By means of this angular adjustment the pattern actually impressed on two adjacent surfaces of the extruded article may be arranged to join up as shown in Fig. 6 and owing to the similar peripheral speed of all the rollers $l$ this condition may be maintained.

It will be seen on inspection of Fig. 2 that the peripheries of the rollers $l$ form an orifice of substantially complete contour but it will be obvious that under some conditions it may be necessary to form the orifice by such peripheries extended. Immediately behind the rollers $l$ a suitable shrouding $r$ is provided to prevent "back spew" of the material being extruded, said shrouding being threaded into the end of the nose piece $e$, whereby the shrouding may be adjusted relatively to the orifice formed between the rollers $l$.

To enable the pattern on the roller $l$ to be readily changed or renewed the tread portion of the rollers $l$ carrying the pattern is removed thus producing a spool like device comprising a hub $l'$ and flanges $l^2$. The flanges $l^2$ of the said spool like device may be so formed as shown in Fig. 5 if desired so as to enable them to act as trimmer devices if made of metal of a comparatively hard character.

The portion of the tread removed is replaced by an insertion $l^3$ of soft metal into which the pattern $l^4$ is forced or knurled thereby enabling special pattern rollers $l$ to be quickly and cheaply produced as required and obviating the necessity of storing or manufacturing a larger number of rollers $l$ having special patterns than can be usefully employed.

Obviously when a set of rollers $l$ are no longer required or are inefficient through wear the soft metal insertion $l^3$ having the pattern $l^4$ may be easily removed and after renewing the soft metal insertion $l^3$ any required pattern can be impressed therein so as to produce an efficient patterned roller $l$.

We claim:—

1. An improved nozzle for machines for extruding plastic material comprising a plurality of rollers the axes of which are disposed at right angles to the axis of the material being extruded means adapted to associate the rollers to form an extrusion orifice the complete contour of which is bounded by portions of the peripheries of the rollers, a shrouding for delivering extruded material to the extrusion orifice bounded by portions of the peripheries of the rollers, said shrouding being adjustable relatively to said orifice.

2. An improved extruding nozzle, as claimed in claim 1, characterized by the arrangement of means for maintaining a predetermined angular relation of any roller about its axs of rotation to adjacent rollers during rotation and means for enabling any roller to be angularly adjusted about its axis relative to adjacent rollers.

3. An improved extruding nozzle as claimed in claim 1, characterized by the rollers being formed with a tread of soft metal for the reception of a pattern impression under pressure said tread of soft metal being disposed between flanges of harder metal which operate as trimming devices.

In testimony whereof we have signed our names to this specification in the presence of two subscribing witnesses.

SPENCER FREEMAN.
RICHARD O'TOOLE.

Witnesses:
  CHAS. R. BULLOUGH,
  EMMIE C. BARRINGER.